United States Patent

Hasebe et al.

[11] Patent Number: 5,953,416
[45] Date of Patent: Sep. 14, 1999

[54] DATA PROCESSING APPARATUS

[75] Inventors: Takayuki Hasebe; Naoya Torii; Masahiko Takenaka, all of Kawasaki, Japan

[73] Assignee: Fujitsu Limited, Kawasaki, Japan

[21] Appl. No.: 08/825,696

[22] Filed: Mar. 20, 1997

[30] Foreign Application Priority Data

Nov. 12, 1996 [JP] Japan .................................. 8-300704

[51] Int. Cl.⁶ ...................................................... H04L 9/00
[52] U.S. Cl. ................................ 380/4; 380/50; 710/116; 710/129; 710/36; 710/55
[58] Field of Search .............................. 380/3, 4, 20–23, 380/25, 43, 48–49, 50; 341/20, 50, 173; 711/121, 152, 163–164; 340/825.31, 825.34; 348/5.5; 395/80–186, 200.3

[56] References Cited

U.S. PATENT DOCUMENTS

| | | | |
|---|---|---|---|
| 4,352,952 | 10/1982 | Boone et al. | 178/22.09 |
| 4,771,462 | 9/1988 | Hannan et al. | 380/44 |
| 4,797,928 | 1/1989 | Dykes | 380/49 |
| 4,907,275 | 3/1990 | Hashimoto | 380/50 |
| 4,914,697 | 4/1990 | Dabbish | 380/28 |
| 4,972,470 | 11/1990 | Farago | 380/3 |
| 5,224,166 | 6/1993 | Hartman | 380/50 |
| 5,228,083 | 7/1993 | Lozowick et al. | 380/9 |
| 5,253,293 | 10/1993 | Shigemitsu | 380/9 |
| 5,325,330 | 6/1994 | Morgan | 365/189.05 |
| 5,371,793 | 12/1994 | Kimura | 380/4 |
| 5,412,730 | 5/1995 | Jones | 380/46 |
| 5,633,934 | 5/1997 | Hember | 380/50 |
| 5,682,425 | 10/1997 | Enari | 380/10 |

*Primary Examiner*—Tod R. Swann
*Assistant Examiner*—Paul E. Callahan
*Attorney, Agent, or Firm*—Staas & Halsey, LLP

[57] ABSTRACT

A data processing apparatus serves as I/O units coupled to information processes apparatuses such as computers. The data processing apparatus decodes encrypted data and performs processing according to message data. The data processing apparatus includes a data processing circuit performing decoding processing and message processing according to message data, a data buffer accessible from both the data processing circuit and the information processing apparatus, a data buffer monitor circuit monitoring states of read/write of the data to the data buffer, and an access control circuit controlling an access from the information processing apparatus to the data buffer.

14 Claims, 9 Drawing Sheets

DATA PROCESSING APPARATUS

BACKGROUND OF THE INVENTION

1. Field of the Invention

The present invention relates to a data processing apparatus which serves as an I/O unit connected to information processing apparatuses such as computers or the like, and is adapted to decode encrypted data and also to perform processings according to message data.

2. Description of the Related Art

Recently, data communication has come into great vogue. In order to prevent illegal use and falsification of messages, a technique has been adopted in which at the transmitting end messages are encrypted and then transmitted, and at the receiving end the encrypted messages are decoded. Another technique has been adopted in which at the transmitting end a signature is included with the messages, and at the receiving end, a signature confirmation processing is performed.

FIG. 1 is a typical illustration useful for understanding a process in which at the transmitting end messages are encrypted and at the receiving end the encrypted messages are decoded.

The transmitting end and the receiving end each have the same key a, as the key for encrypting and decoding messages. At the transmitting end, messages of plain text to be transmitted are locked with the key a, that is, messages are encrypted, so that the encrypted messages are produced and transmitted to the receiving end. Here, for the encryption, there is adopted, for example, a DES (Data Encryption Standard) algorithm or the like. At the receiving end, upon receipt of the encrypted messages, the same DES algorithm or the like is used to open a lock with the key a with respect to the encrypted messages, that is, to decode the messages to be restored. Thereafter, the messages are either interpreted, or processing according to the messages is executed.

FIG. 2 is a typical illustration useful for understanding a process in which at the transmitting end, a signature is included with the messages, and at the receiving end, a signature confirmation processing is performed.

The transmitting end and the receiving end each have a common key b for making up a signature from messages. At the transmitting end, a signature is made up from messages, and the signature is coupled with the messages, so that the messages with the signature, which are referred to as signed messages, are transmitted to the receiving end. In this case, in making up signatures, for the purpose of producing a signature code which is shorter in its length than the messages, there is adopted, usually, a CBC (Cipher Block Chaining) mode or the like. At the receiving end, upon receipt of the messages with signature, a message portion, except for the signature, is signed with the use of the key b, and the signature made in the receiving end is compared with the signature transmitted from the transmitting end. If there is a match therebetween, it is determined that falsification of the message has not occurred halfway through transmission of the message. Thereafter, the messages are either interpreted, or processing according to the messages is executed.

While the encryption processing (FIG. 1) of a message itself and the signature processing (FIG. 2) are separately explained, it has also been a practice that those are combined, so that the message itself is encrypted and also signed, and then transmitted.

Execution of the above-mentioned encryption/decoding processing and inclusion of the signature, along with confirmation processing, makes it possible to maintain safety of communications at a very high level.

By the way, even after receiving messages at the receiving end, the above-mentioned system has been associated with problems set forth below.

For example, it is assumed that the receiving end obtains, by making a contract with the transmitting end, aright to use a certain program and data a predetermined number of times (e.g. 10 times), and the transmitting end transmits over a communication channel the program and data, and additional programs to check a number of times in use of the program and data in accordance with the contract, and then the receiving end receives those items thus transmitted. At that time, the safety of the communication channel is ensured by execution of the above-mentioned encryption/decoding processing and inclusion of the signature, and confirmation processing. However, after those items are received on the receiving end, and decoding of the encrypted messages and the signature confirmation processing are implemented, if the number of times (e.g. 10 times) that the program and data are permitted to be used is falsified, for example, to 100 times, or the decoded program and data are illegally used or copied, those activities will make it possible inadvertently to use unreasonably the program and data outside of the bounds of the contract.

Further, in addition to the problems as to the safety after a reception of the message at the receiving end, there arises such a problem that generally a lot of time is required of a decoding processing for the encrypted messages received at the receiving end and for a signature confirmation processing to occur.

In view of the foregoing, it is considered that an I/O unit to be connected to a computer located at the receiving end is provided with a data buffer accessible from both the inside of the I/O unit and the computer so that the I/O unit implements either a decoding processing for the encrypted data or processing according to the messages.

Providing a data buffer, which is accessible from both the inside of an I/O unit and a computer, on the I/O unit makes it possible to perform in parallel an input of encrypted data from the computer and a decoding processing for the encrypted data in the I/O unit end. Thus, it is a possible to implement high speed data processing. In this case, however, there arises problems as to how timing of the transfer of data between the computer and the inside of the I/O unit is controlled, in other words, how to ensure with certainty that when data is read from a data buffer, the data intended to be read had been written into the data buffer.

An adoption of such an I/O unit has been associated with another problem as set forth below.

That is, a provision of a data buffer, which is accessible from both an I/O unit and a computer, may involve dangers such that, for example, at the stage that the encrypted program and data are decoded into plain text, before the program and data are saved at a safe location, the program and data may be unfairly copied, or for example, at the stage that a signature confirmation processing for messages with a signature is executed and it has been confirmed that the messages are not falsified, before the messages are saved at a safe location, the messages may be unfairly falsified. It is a problem how such dangers are prevented.

On the other hand, hitherto, there are known I/O units connected over channels to large scale computers and another type of I/O units connected via RS-232C, SCSI or the like to personal computers or the like. In case of those I/O units, there is so arranged that after data transmitted from the large scale computers or the personal computers are received in its entirety, processing is initiated, and after the processing is completed, the processed data are transferred to the computer end. Therefore, when it is considered that such an I/O unit serves to perform both the decoding processing and the message processing, there is no danger in which unfair copy and falsification in the middle of processing as mentioned above occur. However, in case of such an I/O unit, even in the event that encrypted data, which are not needed to consider a safety, are simply decoded, or in the event that one self becomes the transmitting end and requests the I/O unit to perform an encryption of messages, it will take a lot of time, as compared to the scheme in which the data transmission and processing are simultaneously performed.

SUMMARY OF THE INVENTION

In view of the foregoing, it is therefore an object of the present invention to provide a data processing apparatus including a data buffer accessible from both an information processing unit such as a computer and one's own self, the data processing apparatus being capable of reducing an overhead of data transmission through control of timing of transfer of data, and also capable of performing high speed decoding processing.

Further, it is another object of the present invention to provide a data processing apparatus including a data buffer accessible from both an information processing unit such as a computer and one's own self, the data processing apparatus being capable of ensuring safety of data.

To attain the above-mentioned objects, according to the present invention, there is provided a first data processing apparatus comprising a data processing circuit, a data buffer, and a data buffer monitor circuit. The data processing circuit decodes encrypted data. The data buffer is connected to an external information processing apparatus, and is accessible from both the data processing circuit and the information processing apparatus. The data buffer monitor circuit informs the data processing circuit, when a write-in of data from the information processing apparatus into the data buffer occurs, of the fact that the write-in of data has occurred, and informs the information processing apparatus, when a write-in of data from the data processing circuit into the data buffer occurs, of the fact that the write-in of data has occurred.

The first data processing apparatus according to the present invention includes the data buffer accessible from both the data processing circuit and the information processing apparatus such as a computer, and the data buffer monitor circuit, as mentioned above. This feature makes it possible to implement decoding processing at higher speed through providing a match of timing of a transfer of data.

Incidentally, while the data processing circuit of the first data processing apparatus executes decoding processing, it is acceptable that the data processing circuit executes an encryption processing, as well, in addition to the decoding processing.

In the first data processing apparatus, it is acceptable to adopt, for example, a dual port memory as the data buffer.

In the first data processing apparatus, it is preferable that the data monitor circuit informs the data processing circuit, when data written into the data buffer from the information processing apparatus are completely read out in its entirety by the data processing circuit, of the fact that all the data have been completely read out, and for informs the information processing apparatus, when data written into the data buffer from the data processing circuit are completely read out in its entirety by the information processing apparatus, of the fact that all the data have been completely read out.

In this case, even in the event that a write-in speed of data into the data buffer is slower than a read-out speed of data from the data buffer, it is possible to ensure a matching of a transfer of data.

Further, in the first data processing apparatus, it is preferable that the data buffer comprises a first data buffer into which data are written from the information processing apparatus, the data stored in the first data buffer being read out by the data processing circuit, and a second data buffer into which data are written from the data processing circuit, the data stored in the second data buffer being read out by the information processing apparatus.

Separating the data buffer into the first data buffer and the second data buffer makes it possible to contribute to a further reduction of a data processing time in total including a transfer of data between the information processing apparatus and the data processing apparatus. It is acceptable to adopt, as the first data buffer and the second data buffer, for example, a FIFO (First-in First-out) memory.

Further, to attain the above-mentioned objects, according to the present invention, there is provided a second data processing apparatus comprising a data processing circuit, a data buffer, and an access control circuit. The data processing circuit executes processing according to message data requesting the processing. The data buffer is connected to an external information processing apparatus, and is accessible from both the data processing circuit and the information processing apparatus. The access control circuit controls an access from the information processing apparatus to the data buffer. The data processing circuit reads out message data written into the data buffer from the information processing apparatus and executes the processing according to the message data thus read out, and when executing the processing according to the message data, instructs the access control circuit to inhibit an access from the information processing apparatus to the data buffer.

The second data processing apparatus includes the access control circuit, and the data processing circuit reads out message data written into the data buffer from the information processing apparatus and executes the processing according to the message data thus read out. When executing the processing according to the message data, instructs the access control circuit to inhibit an access from the information processing apparatus to the data buffer. This feature makes it possible to prevent unfair copies and falsifications, thereby ensuring a safety of message data.

In the second data processing apparatus, it is preferable that the data processing circuit provides such processing that, when message data written into the data buffer from the information processing apparatus is encrypted message data, the message data is decoded into plain text of message data and then the processing according to the message data is executed, and the data processing circuit instructs the access control circuit to inhibit an access from the information processing apparatus to the data buffer, prior to a decoding processing for the encrypted message data.

Further, in the second data processing apparatus, it is preferable that the data processing circuit provides such a processing that, when message data written into the data buffer from the information processing apparatus is message data with a signature, a signature confirmation processing for the message data is performed and then the processing according to the message data is executed, and the data processing circuit instructs the access control circuit to inhibit an access from the information processing apparatus to the data buffer, prior to the signature confirmation processing for the message data.

These features make it possible to ensure safety of message data.

In the second data processing apparatus, it is preferable that the access control circuit optionally inhibits a write-in of data from the information processing apparatus into the data buffer. This feature makes it possible to prevent falsifications. Further, in the second data processing apparatus, it is preferable that the access control circuit optionally inhibits a read-out of data from the data buffer to the information processing apparatus. This feature makes it possible to prevent unfair copies.

Further, in the second data processing apparatus, it is preferable that the data processing circuit includes a processor for executing a program, and while the access control circuit inhibits an access from the information processing apparatus to the data buffer. The data processing circuit executes a processing according to the message data using the data buffer as a working area. This feature makes it possible to reduce a storage capacity of memories to be loaded on the data processing apparatus.

In this case, it is preferable that the data processing circuit erases data stored in at least a part of memory areas of the data buffer, after executing the processing according to the message data, and thereafter the data processing circuit instructs the access control circuit to release an inhibition of an access from the information processing apparatus to the data buffer. This feature makes it possible to further ensure a safety of message data or data made up based on the message data.

Furthermore, to attain the above-mentioned objects, according to the present invention, there is provided a third data processing apparatus comprising a data processing circuit, and a data buffer. The data processing circuit executes processing according to message data requesting the processing. The data buffer is connected to an external information processing apparatus, and is accessible from both the data processing circuit and the information processing apparatus. The data processing circuit includes a local memory accessible from the data processing circuit but unaccessible from the information processing apparatus, and the data processing circuit transfers to the local memory at least a part of message data written into the data buffer from the information processing apparatus, and then executes the processing according to the message data.

According to the third data processing apparatus, the data processing circuit transfers to the local memory at least a part of message data written into the data buffer from the information processing apparatus, and then executes the processing according to the message data. This feature makes it possible to ensure a safety of data.

In the third data processing apparatus, it is preferable that the data processing circuit provides such a processing that, when message data written into the data buffer from the information processing apparatus is encrypted message data, the encrypted message data is transferred to the local memory prior to decoding the encrypted message data into a plain text of message data.

Further, in the third data processing apparatus, it is preferable that the data processing circuit provides such a processing that, when message data written into the data buffer from the information processing apparatus is message data with a signature, part of the message data with the signature except at least the signature is transferred to the local memory prior to a signature confirmation processing for the message data.

These features make it possible to ensure a safety of message data.

Still furthermore, to attain the above-mentioned objects, according to the present invention, there is provided a fourth data processing apparatus comprising a data processing circuit, a data buffer, a data buffer monitor circuit, and an access control circuit. The data processing circuit performs a decoding processing in which encrypted data is decoded, and a message processing according to message data requesting the processing. The data buffer is connected to an external information processing apparatus, and is accessible from both the data processing circuit and the information processing apparatus. The data buffer monitor circuit informs the data processing circuit, when a write-in of data from the information processing apparatus into the data buffer occurs, of the fact that the write-in of data has occurred, and informs the information processing apparatus, when a write-in of data from the data processing circuit into the data buffer occurs, of the fact that the write-in of data has occurred. The access control circuit controls an access from the information processing apparatus to the data buffer. The data processing circuit performs a first processing of reading out encrypted data written into the data buffer from the information processing apparatus and writing the data thus read into the data buffer through practicing a decoding processing, a second processing of reading out message data written into the data buffer from the information processing apparatus and practicing a decoding processing to the message data thus read, and when executing the second processing, instructs the access control circuit to inhibit an access from the information processing apparatus to the data buffer.

The fourth data processing apparatus includes both the features or aspects of the first data processing apparatus and the second data processing apparatus. Thus, according to the fourth data processing apparatus, in the event that there is no problem as to a safety of data, in other words, encrypted data are simply decoded, it contributes to a higher speed processing of data, and on the hand, in the event that there is a problem as to a safety of data, it ensures a safety of data.

As mentioned above, the fourth data processing apparatus includes both the features or aspects of the first data processing apparatus and the second data processing apparatus. Thus, it is permissible to adopt the various embodiments of the first data processing apparatus and the second data processing apparatus as the embodiments of the fourth data processing apparatus.

DESCRIPTION OF THE PREFERRED EMBODIMENTS

Hereinafter, there will be described embodiments of the present invention.

Figure 1:
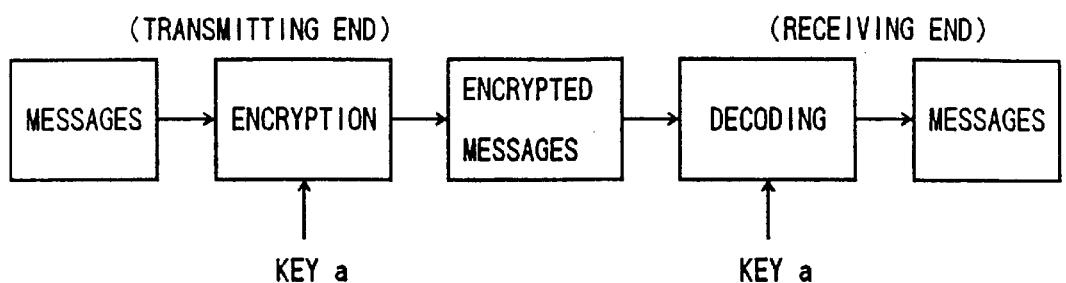
FIG. 1 is a typical illustration useful for understanding a process in which at the transmitting end messages are encrypted and at the receiving end the encrypted messages are decoded.
Figure 2:
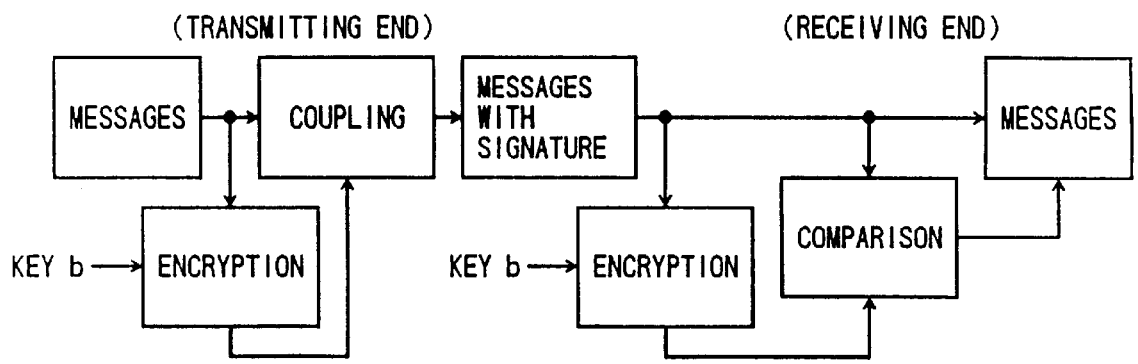
FIG. 2 is a typical illustration useful for understanding a process in which at the transmitting end messages are signed, and at the receiving end a signature confirmation processing is performed.
Figure 3:
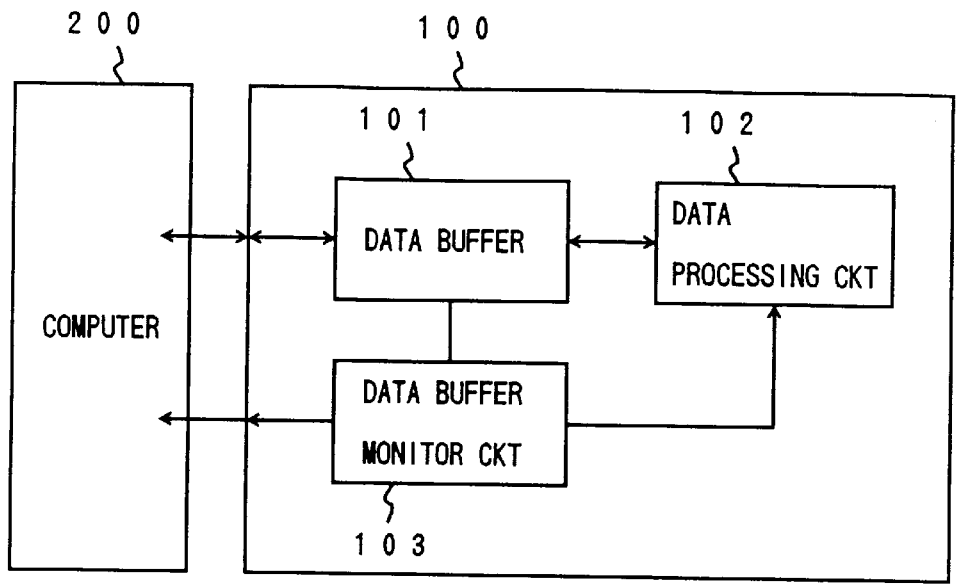
FIG. 3 is a block diagram showing an internal structure of the first data processing apparatus according to an embodiment of the present invention.

FIG. 3 is a block diagram showing an internal structure of the first data processing apparatus according to an embodiment of the present invention.

In FIG. 3, a data processing apparatus 100 serves as an I/O unit of a computer 200. The data processing apparatus 100 comprises a data buffer 101, a data processing circuit 102 and a data buffer monitor circuit 103.

The data buffer 101 is constructed of a dual port memory, and is connected to both an internal bus of the computer 200 and the data processing circuit 102. The data buffer 101 is accessible from both the computer 200 and the data processing circuit 102, and is operative to mediate a transfer of data between the computer 200 and the data processing circuit 102.

The data processing circuit 102 is operative, when encrypted data is written into the data buffer 101 from the computer 200, to read the encrypted data from the data buffer 101 to execute a decoding processing, and to write into the data buffer 101 data of plain text produced through the decoding processing. The data of plain text stored in the data buffer 101 is read out by the computer 200.

The data processing circuit 102 also performs an encryption processing for data. Specifically, the data processing circuit 102 is operative, when data of plain text desired to be encrypted is written into the data buffer 101 from the computer 200, to read the data of plain text from the data buffer 101 to execute an encryption processing, and to write into the data buffer 101 encrypted data produced through the encryption processing. The encrypted data stored in the data buffer 101 is read out by the computer 200.

The data buffer monitor circuit 103 monitors a write-in of data into the data buffer 101 and a read-out of data from the data buffer 101. When a write-in of data into the data buffer 101 from the computer 200 occurs, the data buffer monitor circuit 103 informs the data processing circuit 102 of the fact that the write-in of data into the data buffer 101 occurred. On the other hand, when a write-in of data into the data buffer 101 from the data processing circuit 102 occurs, the data buffer monitor circuit 103 informs the computer 200 of the fact that the write-in of data into the data buffer 101 occurred. Further, when data written into the data buffer 101 from the computer 200 is read out in its entirety by the data processing circuit 102, the data buffer monitor circuit 103 informs the data processing circuit 102 of the fact that there is no data which is not subjected to a read-out. On the other hand, when data written into the data buffer 101 from the data processing circuit 102 is read out in its entirety by the computer 200, the data buffer monitor circuit 103 informs the computer 200 of the fact that there is no data which is not subjected to a read-out. Making a provision of the data buffer monitor circuit 103 reduces an overhead of data transfer.

Figure 4:
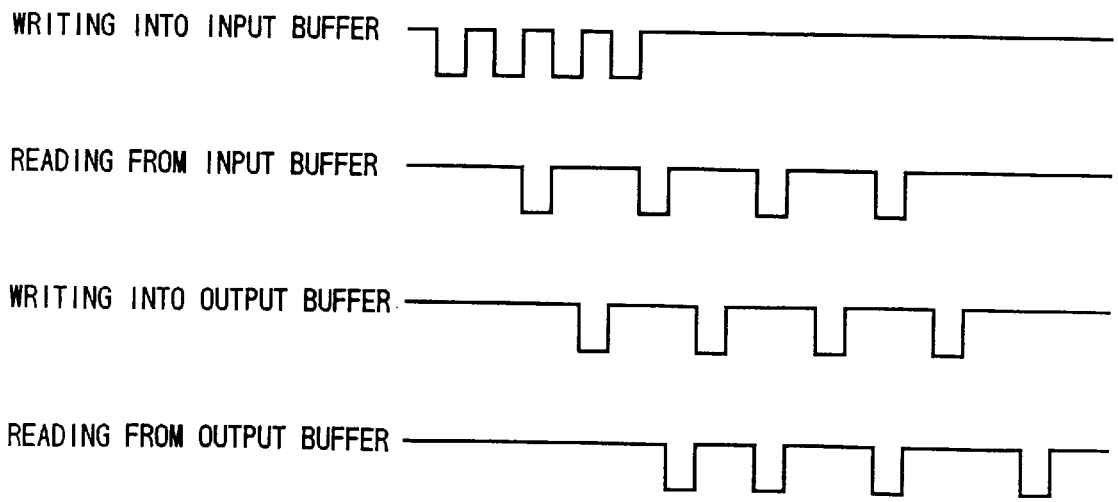
FIG. 4 is a time chart useful for understanding timing of data access to a data buffer in the data processing circuit shown in FIG. 3.

FIG. 4 is a time chart useful for understanding timing of data access to the data buffer 101 in the data processing circuit 100 shown in FIG. 3.

When a write-in of data into the data buffer 101 from the computer 200 is implemented, the data buffer monitor circuit 103 informs the data processing circuit 102 of the fact that the write-in of data into the data buffer 101 has been implemented. Upon receipt of this information, the data processing circuit 102 starts a read-out of data without waiting a completion of a write-in of a series of data to perform a processing, so that the processed data are written in turn into the data buffer 101 in the order processed. The data buffer monitor circuit 103 informs the computer 200 of the fact that a write-in of data into the data buffer 101 occurred. Upon receipt of this information, the computer 200 starts a write-in of data without waiting a completion of a write-in of a series of data from the data processing circuit 102 to the data buffer 101.

As described above, according to the present embodiment, the data processing apparatus 100 shown in FIG. 3 has the data buffer 101 accessible from both the computer 200 and the data processing circuit 102, and the data buffer monitor circuit 103 monitors write-in and read-out of data for the data buffer 101. This feature implements a high speed data processing under control of timing of the write-in and read-out of data.

Figure 5:
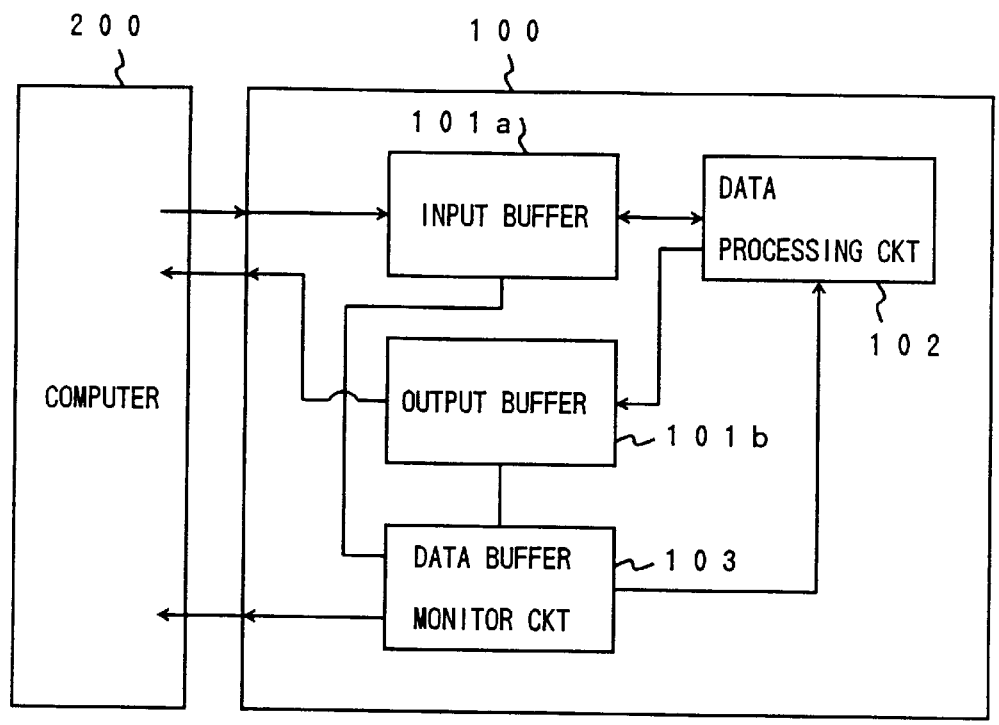
FIG. 5 is a block diagram showing an internal structure of the first data processing apparatus according to an alternative embodiment of the present invention.

FIG. 5 is a block diagram showing an internal structure of the first data processing apparatus according to an alternative embodiment of the present invention.

A data processing apparatus 100 shown in FIG. 5 includes an input buffer 101a and an output buffer 101b, instead of the data buffer 101 shown by a single block in FIG. 3.

Each of the input buffer 101a and the output buffer 101b is constructed of a FIFO memory. A write-in of data into the input buffer 101a is implemented by a computer 200, while a read-out of data from the input buffer 101a is implemented by the data processing circuit 102. On the other hand, a write-in of data into the output buffer 101b is implemented by the data processing circuit 102, while a read-out of data from the output buffer 101b is implemented by the computer 200.

Making a provision of the input buffer 101a and the output buffer 101b permits simultaneous access to when an access to the input buffer 101a and an access to the output buffer 101b occur in the same timing. This feature further reduces a total data processing time.

Figure 6:
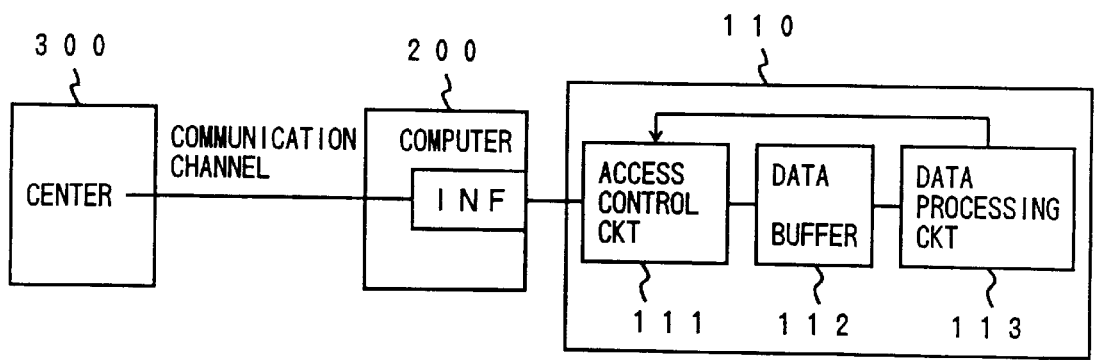
FIG. 6 is a block diagram showing an internal structure of the second data processing apparatus according to an embodiment of the present invention.

FIG. 6 is a block diagram showing an internal structure of the second data processing apparatus according to an embodiment of the present invention.

In FIG. 6, a data processing apparatus 110 serves as an I/O unit of a computer 200. The data processing apparatus 110 comprises an access control circuit 111, a data buffer 112 and a data processing circuit 113.

The computer 200 is connected via a communication channel to a center 300 which serves to transmit message data.

The access control circuit 111 controls an access from the computer 200 to the data buffer 112.

The data buffer 112 is similar to the data buffer 101 shown in FIG. 3, or to both the input buffer 101a and the output buffer 101b. That is, the data buffer 112 may be constructed of a dual port memory or a FIFO memory. The data buffer 112 is accessible from both the computer 200 and the data processing circuit 113, and is operative to mediate a transfer of data between the computer 200 and the data processing circuit 113.

The data processing circuit 113 executes a processing according to a message data requesting the processing. The processing according to the message data is not restricted to specific ones. For example, in a certain case, message data carrying thereon some processing request is fed to the data processing apparatus 110 from the computer 200 or through the computer 200 from the center 300, and a processing according to the processing request is carried out by the data processing circuit 113.

The data processing circuit 113 is operative, when received encrypted message data, to perform a decoding processing in which the message data is decoded to produce plain text of message data so as to be understood, and when received message data with signature, to perform a signature confirmation processing to confirm that the received message data is proper data.

Figure 7:
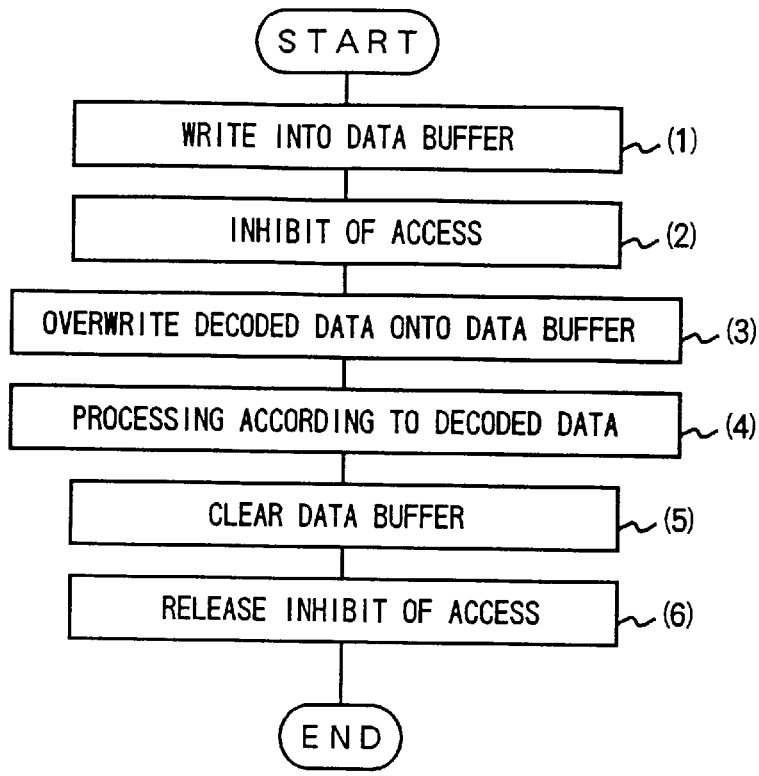
FIG. 7 is a flowchart showing a procedure of a processing of encrypted message data in the data processing apparatus shown in FIG. 6.
Figure 8:
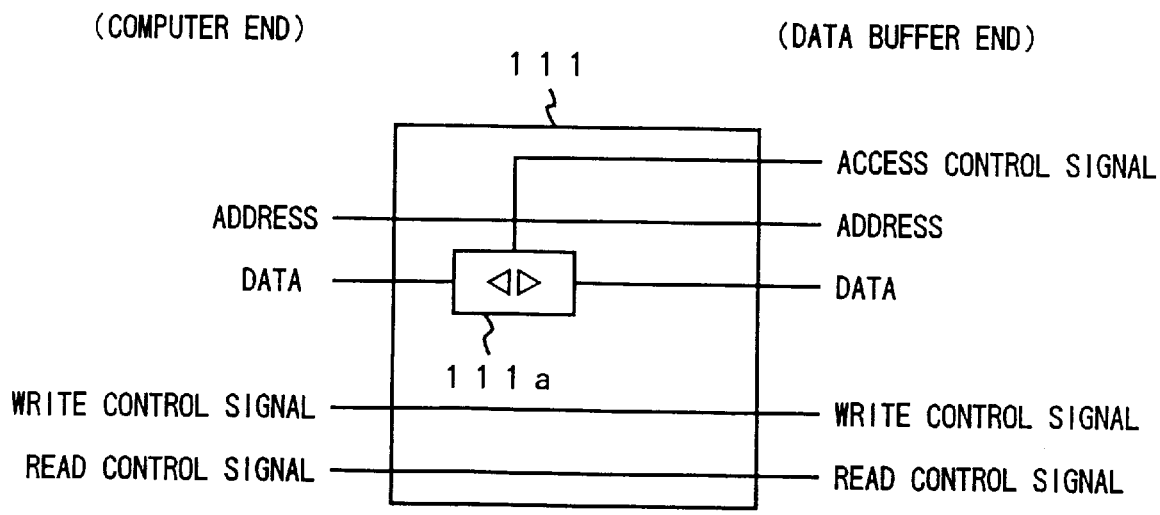
FIGS. 8 to 11 are each a view showing an access inhibition circuit by way of example.
Figure 9:
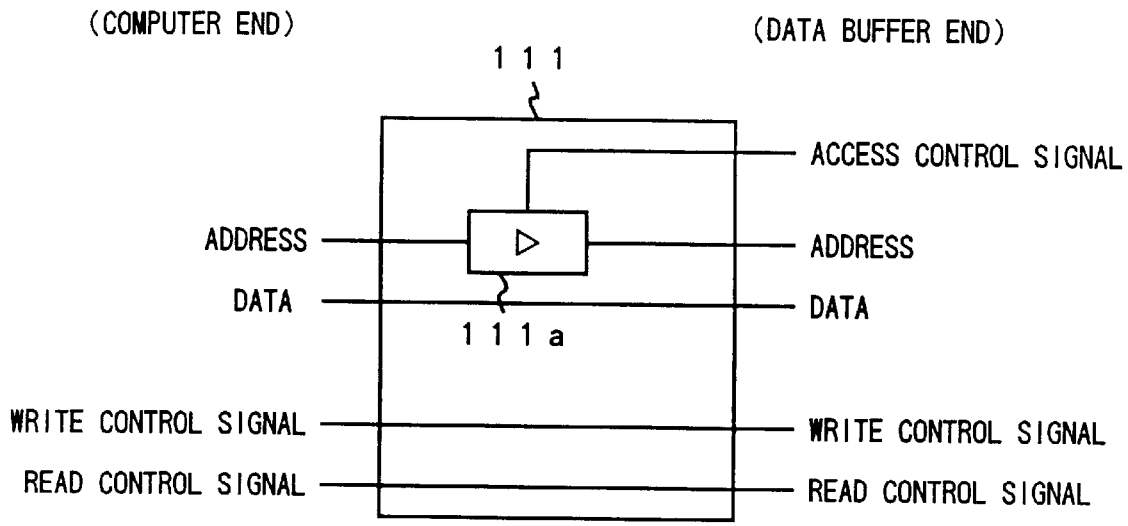
Figure 10:
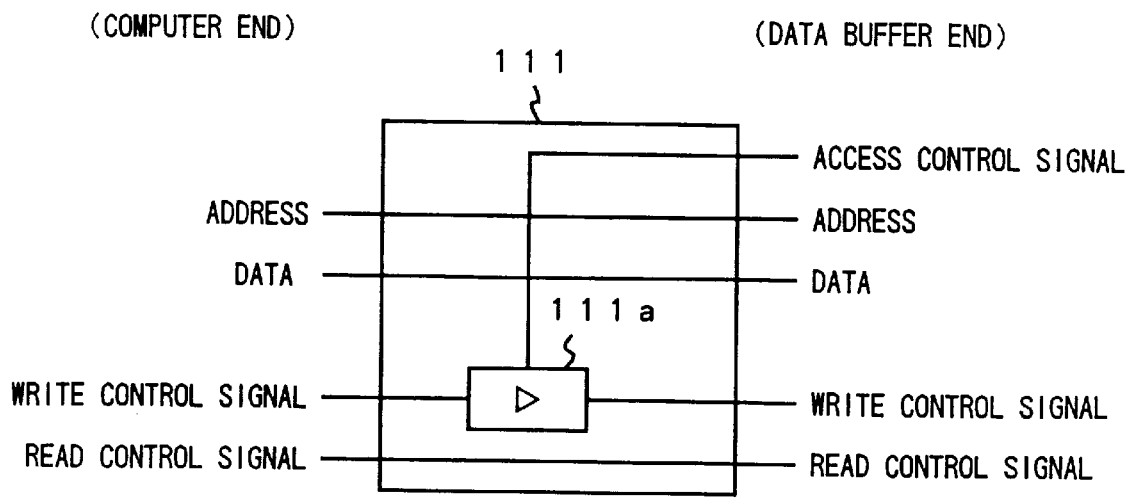
Figure 11:
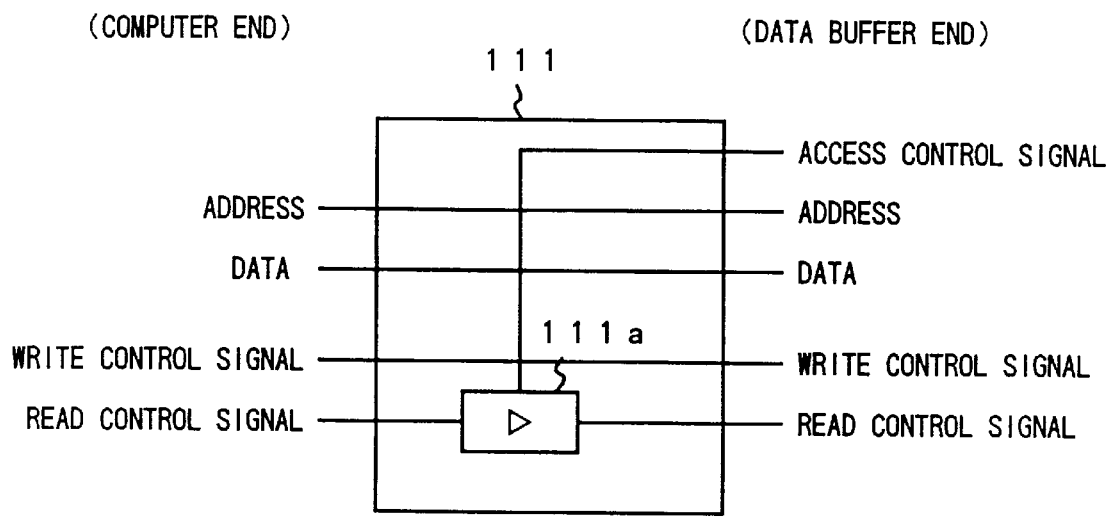

FIG. 7 is a flowchart showing a procedure of a processing of encrypted message data in the data processing apparatus shown in FIG. 6.

In step (1), encrypted message data is written into the data buffer 112 (shown in FIG. 6) from the computer 200 (shown in FIG. 6). In step (2), the data processing circuit 113 (shown in FIG. 6) instructs the access control circuit 111 (shown in FIG. 6) to temporarily inhibit an access from the computer 200 to the data buffer 112, and upon receipt of an instruction, the access control circuit 111 inhibits an access from the computer 200 to the data buffer 112.Thereafter, the data processing circuit 113 reads out the data stored in the data buffer 112 to perform a decoding processing in units of, for example, 8 bits, using the data buffer 112 as a working area for a data processing. In this manner, the decoded plain text of message data is overwritten onto the data buffer 112 (step (3)). Thus, the process goes to a step (4) in which a processing according to the decoded data is carried out.

In this manner, an inhibition of accesses from the computer 200 to the data buffer 112 prior to a decoding processing may prevent, for example, in an inhibition of a write-in of data into the data buffer 112 by the computer 200, a falsification of data stored in the data buffer 112, and in an inhibition of a read-out of data from the data buffer 112 by the computer 200, an unfair copy of data stored in the data buffer 112.

When the processing according to the message data is terminated, the data processing circuit 113 initializes the data buffer 112 to clear the area in which the plain text of message data is stored (step (5)). Thereafter, the process goes to step (6) in which the data processing circuit 113 instructs the access control circuit 111 to release the inhibition of the access from the computer 200 to the data buffer 112, and upon receipt of an instruction, the access control circuit 111 releases the inhibition of the access from the computer 200 to the data buffer 112.

While the above description explains about the encrypted message data, it is similar also in case of message data with a signature. That is, prior to a signature confirmation processing, an access from the computer 200 to the data buffer 112 is inhibited, and after the processing according to the message data is terminated the data buffer 112 is cleared. And thereafter, an inhibition of the access from the computer 200 to the data buffer 112 is released.

FIGS. 8 to 11 are each a view showing an access inhibition circuit by way of example.

The computer 200 (shown in FIG. 6) and the data buffer 112 (shown in FIG. 6) are coupled with each other through an address line used for instructing an address of the data buffer 112 directed from the computer 200 to the data buffer 112, a data line used for transmitting data to be transferred between the computer 200 and the data buffer 112, a write-in control signal line used for transmitting a write-in control signal to instruct a write-in of data directed from the computer 200 to the data buffer 112, and a read-out control signal line used for transmitting a read-out control signal to instruct a read-out of data directed from the computer 200 to the data buffer 112. Particularly, in cases of the access inhibition circuits shown in FIGS. 8 to 11, the data line, the address line, the write-in control signal line and the read-out control signal line include respectively an access gate 111a for controlling turn-on and turn-off in transmission of signals in accordance with an access control signal outputted from the data processing circuit 113. Thus, a transmission of data, a transmission of addresses, a transmission of the write-in control signal and a transmission of the read-out control signal are controlled by the associated access gates 111a, respectively. In this manner, in cases of the access inhibition circuits shown in FIGS. 8 to 9, both the write-in and the read-out of data from the computer 200 to the data buffer 112 are restricted; in case of the access inhibition circuit shown in FIG. 10, an access for the write-in of data from the computer 200 to the data buffer 112 is restricted; and in case of the access inhibition circuit shown in FIG. 11, an access for the read-out of data from the computer 200 to the data buffer 112 is restricted. Now, it is assumed that the address signal and the control signals are involved in the negative logic and when the access control signal offers an "H" level, the access is inhibited. In this situation, as the access gate 111a, for example, an OR gate may be used. Further, in the events that the access gate 111a is included in the data line, there will be considered a high impedance control by the use of a three-state type of buffer other than the OR gate and an AND gate.

Figure 12:
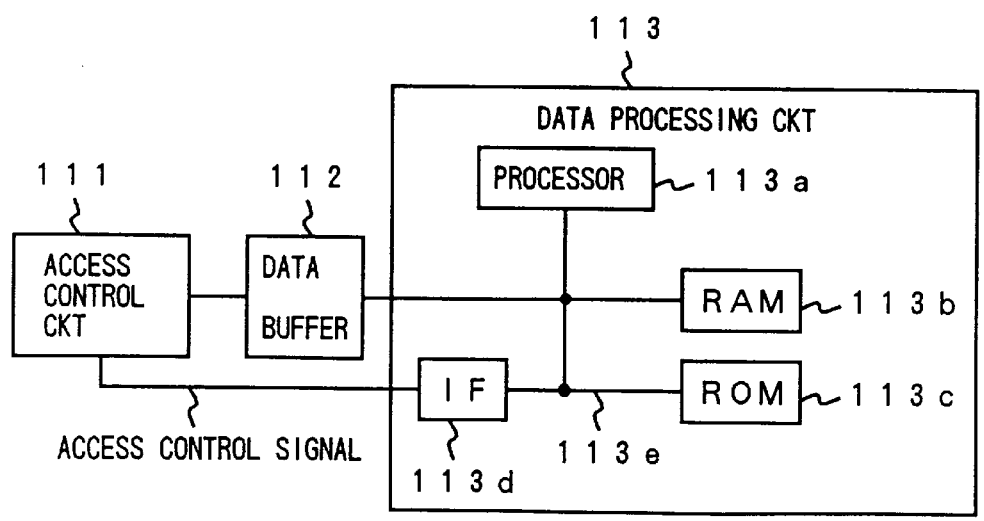
FIG. 12 is a schematic diagram showing an internal structure of the data processing circuit.

FIG. 12 is a schematic diagram showing an internal structure of the data processing circuit 113 of the data processing apparatus shown in FIG. 6.

The data processing circuit 113 comprises a processor 113a for executing a program, a RAM (Random-Access Memory) 113b, a ROM (Read-Only Memory) 113c and an interface 113d. The processor 113a, the RAM 113b, the ROM 113c and the interface 113d are interconnected through a local bus 113e. The data buffer 112 is also connected to the local bus 113e. Consequently, the processor 113a is permitted to use the data buffer 112 as a working area in execution of programs.

The access control signal is transferred via the interface 113d to the access control circuit 111 to turn on or off the access gate 111a of the access control circuit 111.

An arrangement, as shown in FIG. 12, in which the data buffer 112 is connected to the local bus 113e so that the data buffer 112 can be accessed directly from the processor 113a, reduces a memory capacity of the RAM 113b as a local memory.

Figure 13:
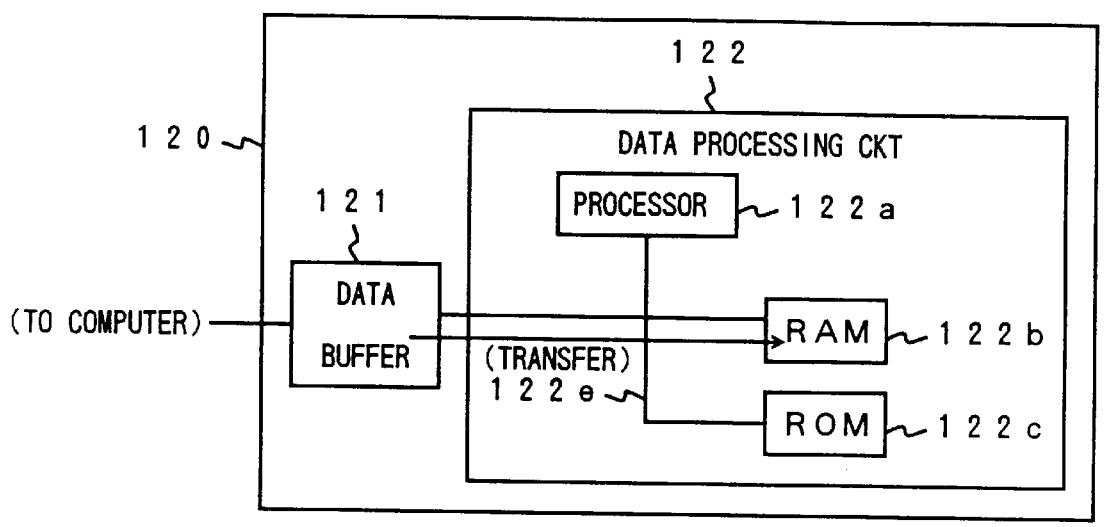
FIG. 13 is a block diagram showing an internal structure of the third data processing apparatus according to an embodiment of the present invention.

FIG. 13 is a block diagram showing an internal structure of the third data processing apparatus according to an embodiment of the present invention.

In FIG. 13, a data processing apparatus 120 comprises a data buffer 121 and a data processing circuit 122. The data processing circuit 122 comprises a processor 122a, a RAM 122b, a ROM 122c and a local bus 122e.

The data buffer 121 and the data processing circuit 122 correspond to the data buffer 112 and the data processing circuit 113 in the data processing apparatus shown in FIG. 12, respectively. The processor 122a, the RAM 122b, the ROM 122c and the local bus 122e correspond to the processor 113a, the RAM 113b, the ROM 113c and the local bus 113e in the data processing apparatus shown in FIG. 12, respectively. However, the data processing apparatus 120 shown in FIG. 13 has no access control circuit 111 as shown in FIG. 12. Hence, the data processing circuit 122 has also no interface 113d as shown in FIG. 12.

When encrypted message data or message data with a signature are written into the data buffer 121 from the computer 200 (cf. FIG. 6), the written message data are transferred to the RAM 122b of the data processing circuit 122 prior to the decoding processing or the signature confirmation processing, and thereafter the decoding processing or the signature confirmation processing, and a processing according to the message data are executed. In the event that those processings are executed, the RAM 122b is used as a working area, but the data buffer 121 is not used as a working area.

The computer 200 can access the data buffer 121, but cannot directly access the RAM 122b. Therefore, a processing with the use of the RAM 122b as the working area ensures a safety of the data.

Figure 14:
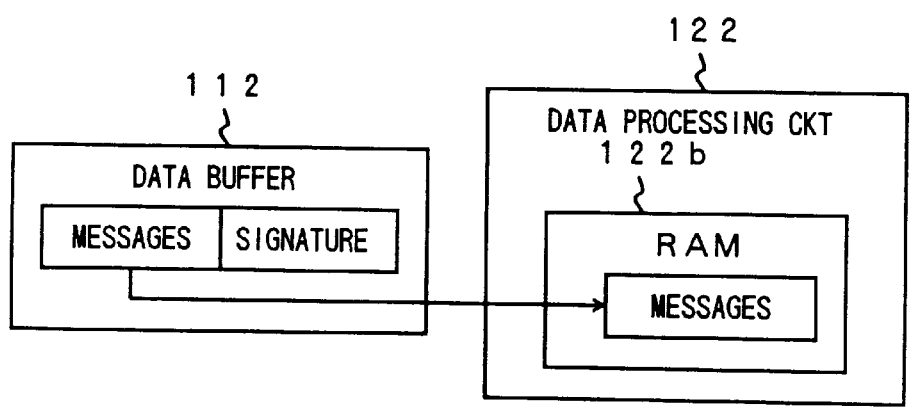
FIG. 14 is an explanatory view useful for understanding a transfer of message data with a signature.

FIG. 14 is an explanatory view useful for understanding a transfer of message data with a signature.

In case of the message data with a signature, one which is needed to be transferred from the data buffer 112 to the RAM 122b of the data processing circuit 122 is only a message data portion except the signature portion. Thus, the transfer of only the message portion reduces time required for transfer, thereby reducing time required for the overall data processing.

Figure 15:
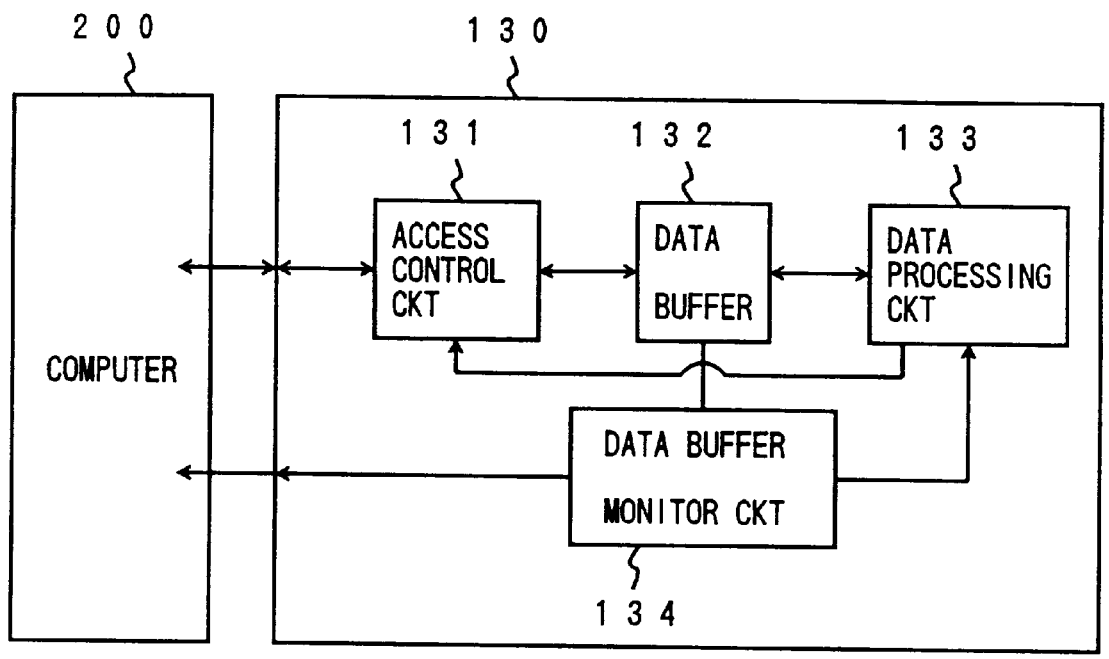
FIG. 15 is a block diagram showing an internal structure of the fourth data processing apparatus according to an embodiment of the present invention.

FIG. 15 is a block diagram showing an internal structure of the fourth data processing apparatus according to an embodiment of the present invention.

In FIG. 15, a data processing apparatus 130 comprises an access control circuit 131, a data buffer 132, a data processing circuit 133 and a data buffer monitor circuit 134. The data processing apparatus 130 has both the structures of the first data processing apparatus (cf. FIG. 3) and the second data processing apparatus (cf. FIG. 6). The data processing circuit 133 performs both a processing in which encrypted data inputted from the computer 200 is decoded into plain text of data, or encrypted data is produced from plain text of data, and those data are returned to the computer 200, and a processing according to message data inputted from the computer 200. However, in execution of the processing of message data, in the event that the message data is the encrypted message data or the message data with a signature, a decoding processing for the message data or a signature confirmation processing is performed, prior to an execution of the processing according to the message data.

As mentioned above, the data processing circuit 133 serves to perform both the processing in which only the encryption or decoding processing is carried out and the results of the processing are returned to the computer 200, and the message processing. Therefore, it is necessary for the data processing apparatus 130 to recognize which one of those processings are required to be executed.

Figure 16:
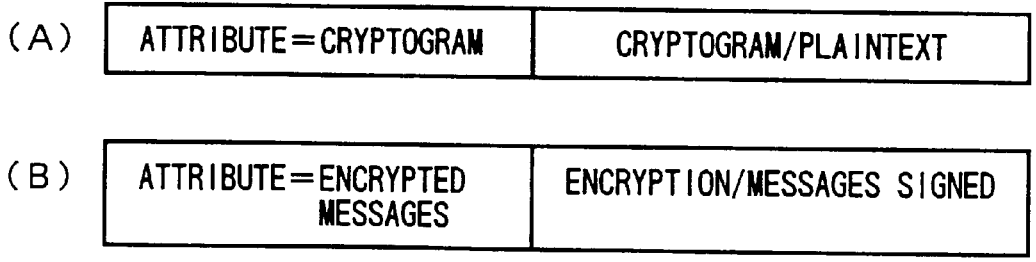
FIG. 16 is an explanatory view useful for understanding a technique for recognition of processings.

FIG. 16 is an explanatory view useful for understanding a technique for recognition of processings.

When it is intended that the data processing apparatus 130 (shown in FIG. 15) serves to perform only the encryption or decoding processing, the computer 200 sends to the data processing apparatus 130, as shown in a part (A) of FIG. 16, data (cryptogram or plain text) to which an attribute referred to as "cryptogram" is appended. On the other hand, when it is intended that the data processing apparatus 130 serves to perform the processing according to the message, the computer 200 sends to the data processing apparatus 130, as shown in a part (B) of FIG. 16, data (an encrypted message or a message with a signature) to which an attribute referred to as "encrypted message" is appended. The data processing apparatus 130 recognizes a distinction of processing to be executed in accordance with the attribute data.

Figure 17:
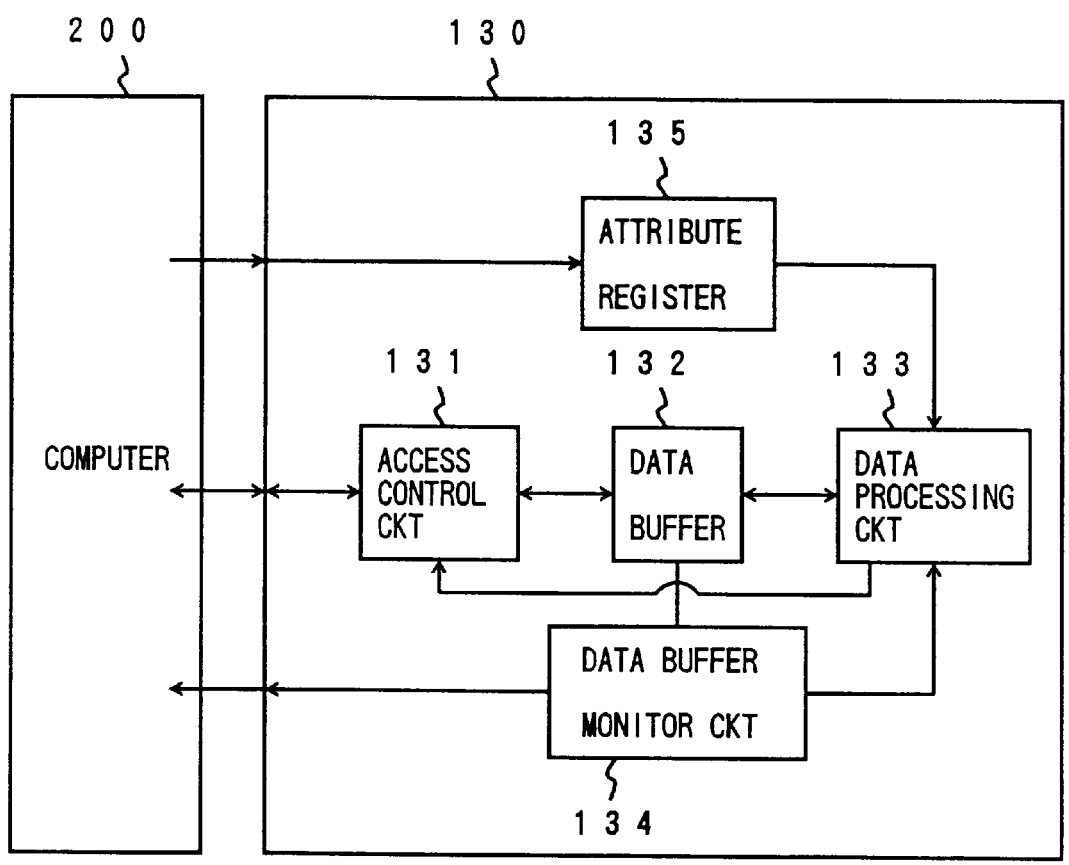
FIG. 17 is an explanatory view useful for understanding an alternative technique for recognition of processings.

FIG. 17 is an explanatory view useful for understanding an alternative technique for recognition of processing.

In FIG. 17, the data processing apparatus 130 has an attribute register 135 into which data is written by the computer 200 and from which data is read out by the data processing circuit 133. The computer 200 writes, when sending data to the data processing apparatus 130, an associated attribute of the data into the attribute register 135. The data processing apparatus 130 recognizes a distinction of processing to be executed in accordance with the attribute data stored in the attribute register 135. While FIG. 17 shows separately the attribute register and the data buffer, it is acceptable that an area within the data buffer is used as the attribute register.

An arrangement, as shown in FIG. 15, of the fourth data processing apparatus in which the first data processing apparatus and the second data processing apparatus are combined in structure, implements a data processing apparatus capable of meeting the wide demands.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A data processing apparatus comprising:
   a data processing circuit decoding encrypted data;
   a data buffer connected to an external information processing apparatus, said data buffer being accessible from both said data processing circuit and said information processing apparatus; and a data buffer monitor circuit informing said data processing circuit, when a write-in of data from said information processing apparatus into said data buffer occurs, of the fact that the write-in of data has occurred, and informing said information processing apparatus, when a write-in of data from said data processing circuit into said data buffer occurs, of the fact that the write-in of data has occurred.

2. A data processing apparatus according to claim 1, wherein said data monitor circuit informs said data processing circuit, when data written into said data buffer from said information processing apparatus are completely read out in its entirety by said data processing circuit, of the fact that all the data have been completely read out, and informing said information processing apparatus, when data written into said data buffer from said data processing circuit are completely read out in its entirety by said information processing apparatus, of the fact that all the data have been completely read out.

3. A data processing apparatus according to claim 1, wherein said data buffer comprises a first data buffer into which data are written from said information processing apparatus, the data stored in said first data buffer being read out by said data processing circuit, and a second data buffer into which data are written from said data processing circuit, the data stored in said second data buffer being read out by said information processing apparatus.

4. A data processing apparatus comprising:

a data processing circuit executing a processing according to message data requesting the processing;

a data buffer connected to an external information processing apparatus, said data buffer being accessible from both said data processing circuit and said information processing apparatus; and an access control circuit controlling an access from said information processing apparatus to said data buffer, wherein said data processing circuit reads out message data written into said data buffer from said information processing apparatus and executes the processing according to the message data thus read out, and when executing the processing according to the message data, instructs said access control circuit to inhibit an access from said information processing apparatus to said data buffer.

5. A data processing apparatus according to claim 4, wherein said data processing circuit provides processing such that, when message data written into said data buffer from said information processing apparatus is encrypted message data, the message data is decoded into plain text of message data and then the processing according to the message data is executed, and said data processing circuit instructs said access control circuit to inhibit an access from said information processing apparatus to said data buffer, prior to a decoding processing the encrypted message data.

6. A data processing apparatus according to claim 4, wherein said data processing circuit provides processing such that, when message data written into said data buffer from said information processing apparatus is message data with a signature, signature confirmation processing the message data is performed and then the processing according to the message data is executed, and said data processing circuit instructs said access control circuit to inhibit an access from said information processing apparatus to said data buffer, prior to the signature confirmation processing the message data.

7. A data processing apparatus according to claim 4, wherein said access control circuit optionally inhibits a write-in of data from said information processing apparatus into said data buffer.

8. A data processing apparatus according to claim 4, wherein said access control circuit optionally inhibits a read-out of data from said data buffer to said information processing apparatus.

9. A data processing apparatus according to claim 4, wherein said data processing circuit includes a processor executing a program, and while said access control circuit inhibits an access from said information processing apparatus to said data buffer, said data processing circuit executes processing according to the message data using said data buffer as a working area.

10. A data processing apparatus according to claim 9, wherein said data processing circuit erases data stored in at least a part of memory areas of said data buffer, after executing the processing according to the message data, and thereafter said data processing circuit instructs said access control circuit to release an inhibition of an access from said information processing apparatus to said data buffer.

11. A data processing apparatus comprising:

a data processing circuit executing processing according to message data requesting the processing; and a data buffer connected to an external information processing apparatus, said data buffer being accessible from both said data processing circuit and said information processing apparatus, wherein said data processing circuit comprises a local memory accessible from said data processing circuit but unaccessible from said information processing apparatus, and said data processing circuit transfers to said local memory at least a part of message data written into said data buffer from said information processing apparatus, and then executes the processing according to the message data.

12. A data processing apparatus according to claim 11, wherein said data processing circuit provides processing such that, when message data written into said data buffer from said information processing apparatus is encrypted message data, the encrypted message data is transferred to said local memory prior to decoding the encrypted message data into a plain text of message data.

13. A data processing apparatus according to claim 11, wherein said data processing circuit provides processing such that, when message data written into said data buffer from said information processing apparatus is message data with a signature, part of the message data with the signature except at least the signature is transferred to said local memory prior to a signature confirmation processing the message data.

14. A data processing apparatus comprising:

a data processing circuit performing decoding processing in which encrypted data is decoded, and message processing according to message data requesting the processing;

a data buffer connected to an external information processing apparatus, said data buffer being accessible from both said data processing circuit and said information processing apparatus;

a data buffer monitor circuit informing said data processing circuit, when a write-in of data from said information processing apparatus into said data buffer occurs, of the fact that the write-in of data has occurred, and informing said information processing apparatus, when a write-in of data from said data processing circuit into said data buffer occurs, of the fact that the write-in of data has occurred; and an access control circuit controlling an access from said information processing apparatus to said data buffer, wherein said data processing circuit performs a first processing of reading out encrypted data written into said data buffer from said information processing apparatus and writing the data thus read into said data buffer through practicing a decoding processing, a second processing of reading out message data written into said data buffer from said information processing apparatus and practicing a decoding processing to the message data thus read, and when executing the second processing, instructs said access control circuit to inhibit an access from said information processing apparatus to said data buffer.

\* \* \* \* \*